(12) United States Patent
Testa et al.

(10) Patent No.: US 6,450,657 B1
(45) Date of Patent: Sep. 17, 2002

(54) LIGHTED PANEL DEVICE ABLE TO BE APPLIED ONTO POSTS

(75) Inventors: Enrico Testa; Giuseppe Nucci, both of Rome (IT)

(73) Assignee: S.o.l.e. Societa Luce Elettrica S.p.A. Gruppo Enel, Perugia (IT)

( * ) Notice: Subject to any disclaimer, the term of this patent is extended or adjusted under 35 U.S.C. 154(b) by 0 days.

(21) Appl. No.: 09/743,028

(22) PCT Filed: Nov. 30, 1999

(86) PCT No.: PCT/IT99/00392

§ 371 (c)(1),
(2), (4) Date: Jan. 4, 2001

(87) PCT Pub. No.: WO00/67244

PCT Pub. Date: Nov. 9, 2000

(30) Foreign Application Priority Data

May 4, 1999 (IT) ........................................ RM99A0276

(51) Int. Cl.$^7$ .............................................. G09F 13/00
(52) U.S. Cl. ......................... 362/31; 362/812; 362/145; 362/225; 362/260
(58) Field of Search ......................... 362/31, 812, 559, 362/576, 145, 260, 225, 217

(56) References Cited

U.S. PATENT DOCUMENTS

| | | | | |
|---|---|---|---|---|
| 1,850,319 A | * | 3/1932 | Fensom et al. | 362/812 |
| 5,579,598 A | * | 12/1996 | Fallon et al. | 362/812 |
| 5,967,355 A | * | 10/1999 | Ragot | 362/812 |
| 6,308,444 B1 | * | 10/2001 | Ki | 362/812 |
| 2001/0022721 A1 | * | 9/2001 | Konomi | 362/812 |

* cited by examiner

Primary Examiner—Laura K. Tso
(74) Attorney, Agent, or Firm—Browdy and Neimark

(57) ABSTRACT

A lighted panel display, able to be applied onto road lighting posts, comprises at least a board with a frame having, as its horizontal sides, lower and upper elongated plates and, as its vertical sides, two uprights and luminous display panel, housed in said frame. If the panel is a clear sheet bearing images and/or captions, two fluorescent lamps, housed within each upright, emit light only within the sheet through longitudinal openings of the uprights.

20 Claims, 2 Drawing Sheets

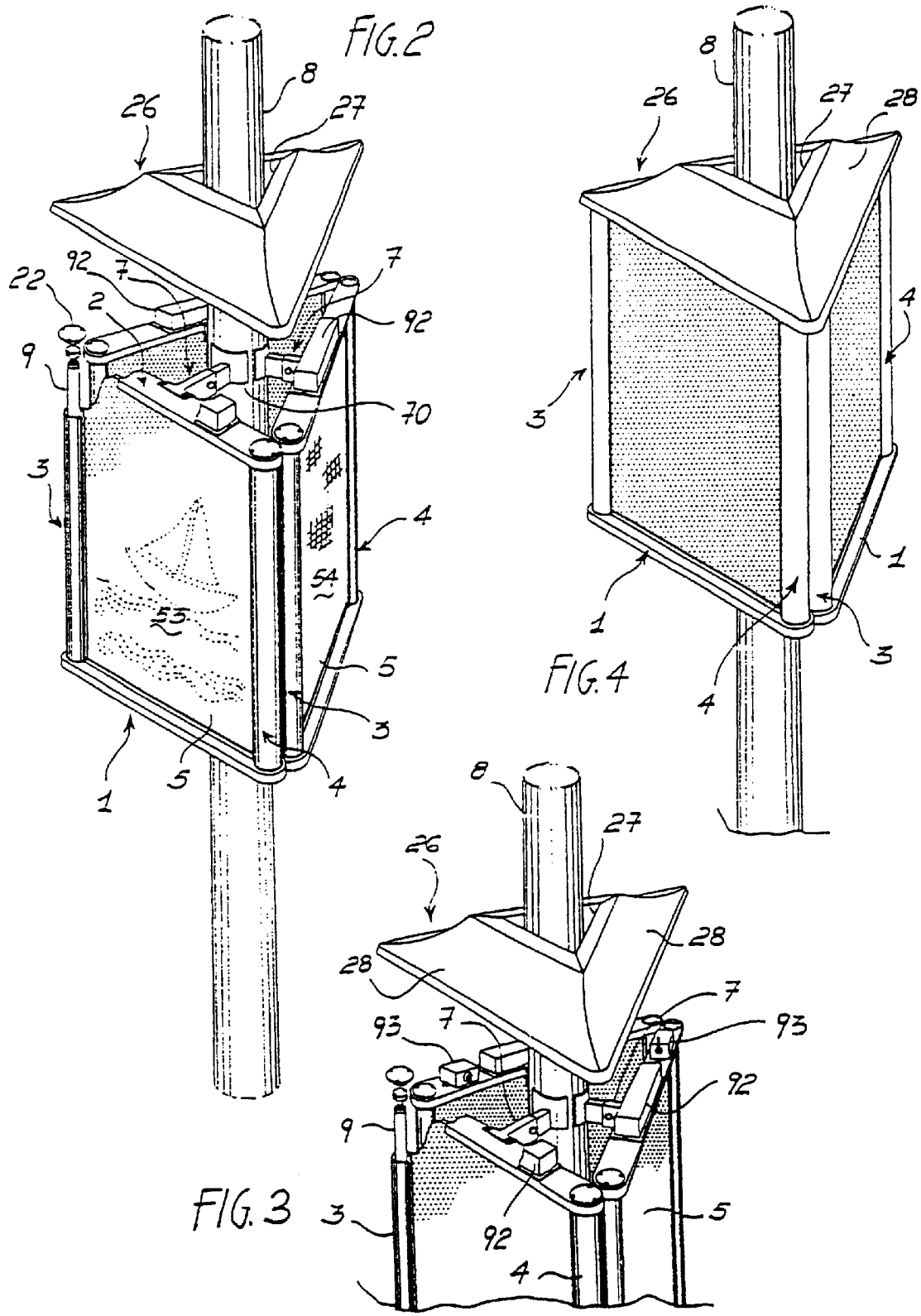

LIGHTED PANEL DEVICE ABLE TO BE APPLIED ONTO POSTS

TECHNICAL FIELD

The present invention relates to a lighted panel able to be applied onto posts, in particular posts for road lighting or the like. The device is destined to the display of advertising and/or notices or communications also of public utility.

BACKGROUND ART

In current urban décor, especially in large cities, lighted panels can be widely observed. They generally present ample planar surfaces, mounted, generally opposing each other, on support elements of various shapes and sizes, bearing images and/or captions back-lighted with light sources, generally fluorescent or incandescent lamps situated between such planar surfaces in a box-like container. The purpose of the lighted panels is to make more visible at a distance advertising or informational posters placed on the planar surfaces than they would be if they were lighted by incident light alone, in order more effectively to attract the attention of motorists and pedestrians during night-time hours.

To allow back-lighting, the light sources, usually the so-called neon lamps, are sandwiched between said planar surfaces, generally made of clear plastic material.

This known type of lighted panels with back-lighted surfaces presents some drawbacks. In them, illumination is not distributed uniformly over the entire surface to light and therefore causes the poor definition of the contours of the images or captions to be lighted. A poor level of visual quality is determined, thereby weakening the communication effectiveness of an advertising message. Moreover, the luminosity of known panels, with the strong contrasts of the light that exits therefrom, creates a blinding or in any case an annoying effect for those who watch, whilst too weak a light leads them to turn their gaze away from the image or caption. Additionally, current structures for the display of advertising posters require ample display surfaces and need scaffolding, frames, uprights, and other bulky support structures, which generally have the tendency to influence negatively on a landscape and, in particular, on an urban decor. The costs of these lighted panels are increased, in addition to the provision of such structures, also by the need to connect them to an adequate electrical power supply. Moreover, current lighted panels are unidirectional, in that they are visible only frontally, unless arched panel surfaces, visible from multiple directions, are created.

DISCLOSURE OF INVENTION

The aim of the present invention, therefore, is to overcome the aforementioned drawbacks manifested by prior art lighted panels.

In particular an aim of the present invention is to allow the uniform lighting of images and/or captions.

Another aim of the present invention is to create an illumination of images and/or captions which does not cause annoyance to motorists and pedestrians, and which complies with the provisions of the Rules of the Road, in particular not endangering road circulation.

Yet a further aim of the invention is to allow viewing images and/or captions with high definition, in a clear and attractive manner.

An additional aim of the present invention is to realise lighted panels which do not require bulky structures that may negatively impact on the landscape.

Still another aim of the present invention is to provide sets of lighted panels visible from multiple directions.

A further aim of the invention is to realise a lighted panel which allows for the easy replacement of the images and/or captions to be displayed, without requiring a large employment of means and operative personnel.

Yet an additional aim of the invention is to realise lighted panels which do not entail problems for their connection to an electrical power supply grid.

These aims, and others besides, are all attained by a lighted panel display able to be applied onto posts, in particular road lighting posts or the like, for the display of advertisements and/or notices or communications also of public utility, which, from a general point of view, is characterised in that it comprises at least a board comprising:

a frame having, as its horizontal sides, a lower and upper elongated plates, both provided, on opposite faces, with housing seats for a panel and, on corresponding flanks, with means for fastening to a road lighting post or the like and, as vertical sides, two hollow section uprights with longitudinal opening for housing a panel;

a panel for the lighted display of images and/or captions, having lower and upper edges received in said respective housing seats obtained on said lower and upper elongated plates and side edges inserted and held by said uprights in their said longitudinal housing opening;

means for controlling, powering and lighting the panel;

a covering and finishing element removably fastened onto said upper elongated plate;

said lower elongated plate being provided, in correspondence with the respective extremities of said panel housing seat, with a pair of equal receiving cavities, of conforming section, of the lower extremities of said uprights; said upper elongated plate being provided, in correspondence with the respective extremities of said panel housing seat, with a pair of through holes of conforming section for the upper extremities of said uprights, respective closure stoppers being provided for said through holes.

Advantageously, the structures for the support of the lighted panels according to the invention are represented by elements already present in an urban décor, such as lighting posts or the like, thereby considerably reducing the installation costs of the panels themselves.

Moreover, the lighted panels according to the invention, being mounted on lighting posts, are advantageously near an electrical power supply line and this allows a further considerable saving in their installation costs.

Further features and advantages of the present invention shall become more readily apparent from the detailed description that follows of preferred embodiments, illustrated purely by way of non limiting indication in the accompanying drawings.

DESCRIPTION OF THE DRAWINGS

FIG. 2 shows a partially sectioned and exploded axonometric view of a device with three lighted panels according to the present invention applied to a road lighting post or the like;

FIG. 3 shows a partially sectioned and exploded schematic axonometric view of a variation of the device of FIG. 2; and FIG. 4 shows a schematic axonometric view of the device of FIGS. 2 and 3.

DESCRIPTION OF THE ILLUSTRATIVE EMBODIMENTS

Figure 1:
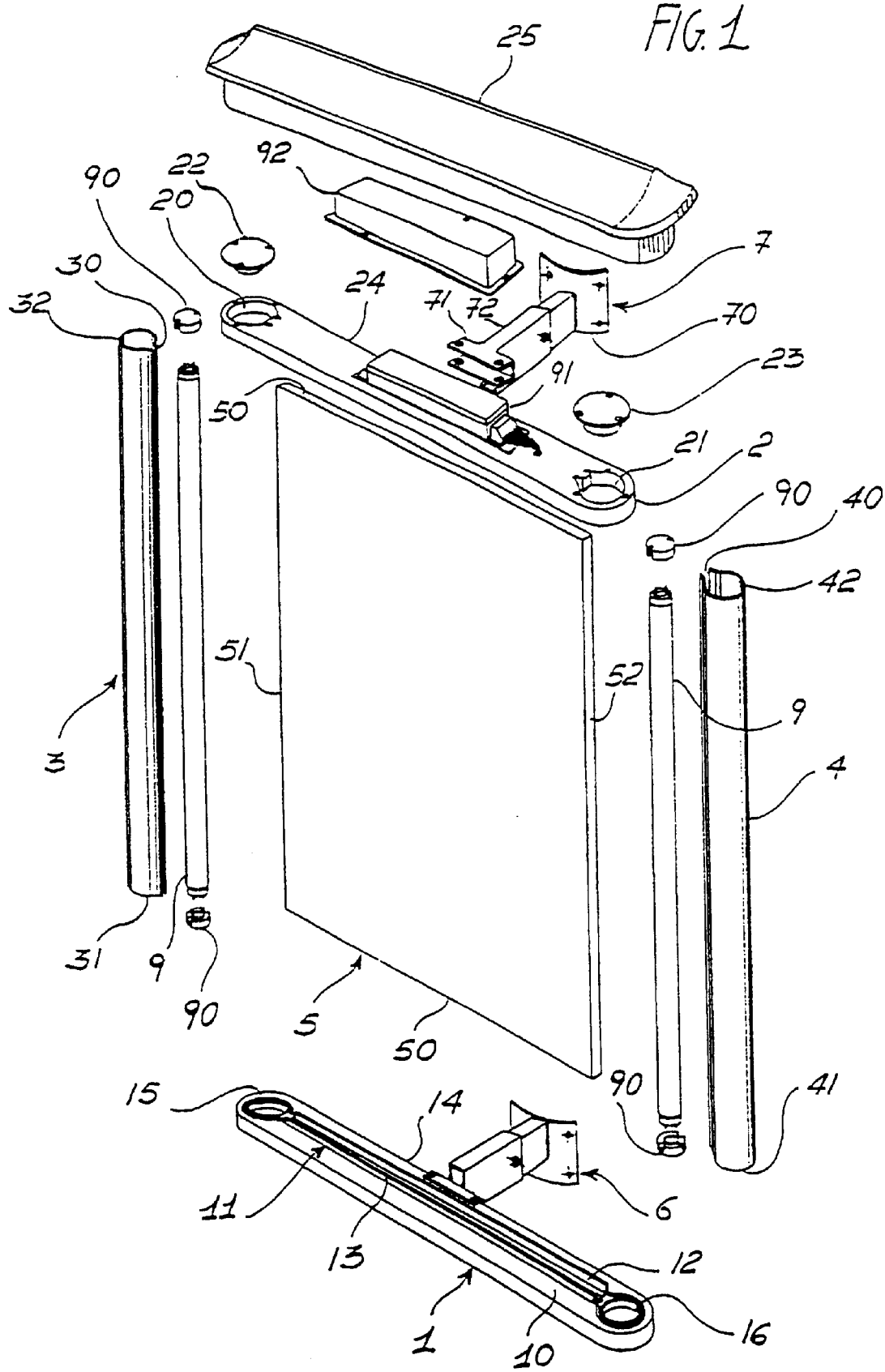
FIG. 1 shows an exploded schematic axonometric view of a first embodiment of a device with a single lighted panel according to the present invention.

With reference to a first embodiment of the invention, FIG. 1 shows, in exploded axonometric view, a device with a single lighted panel. The frame of the panel (as shown it has rectangular shape, but its shape could be different) has, as its horizontal sides, a lower elongated plate 1 and an upper elongated plate 2 and, as its vertical sides, two uprights 3, 4 with hollow section. The elongated plates 1 and 2 and the uprights 3, 4 delimit a panel 5. In this first embodiment the panel 5 is constituted by a plate of plastic material, for instance polycarbonate, or of different material.

In order to hold the panel 5, the elongated plates 1 and 2 are provided, on mutually opposite plates (FIG. 1 shows only the face 10 of the elongated plate 1), with housing seats 11, fitted with sealing gasket. The housing seat 11 of the elongated plate 1 presents two linear projections 12 and 13 destined to receive and hold in their inter-space a lower edge 50 of the panel 5.

The uprights 3, 4 have an open hollow profile section. The section is shown as being circular, but it can also be polygonal. It presents and opening 30, 40 for the insertion of lateral edges 51, 52 of the panel in the respective uprights 3, 4. Between the panel 5 and the uprights 3 and 4, sealing gaskets (not shown herein) may be provided.

To form a frame, the lower elongated plate 1 is provided, in correspondence with the extremities of the panel housing seat 11, with a pair of equal receiving cavities 15, 16, with section conforming to that of the lower extremities 31, 41 of the uprights 3,4. These extremities can be fitted in the cavities 15, 16 with the interposition of a sealing gasket. The upper elongated plate 2 is similarly provided with a pair of through holes 20, 21 for the upper extremities 32, 42 of the uprights 3, 4. The holes 20, 21 have their section conforming to that of the uprights 3, 4, but with greater surface are, in order to allow their upwards extraction. The holes 20, 21 are closed with respective closure stoppers 22, 23 fastened by screwing onto the elongated plate 2. The upper elongated plate 2 is surmounted by a covering element 25 destined to serve as a protection and finish for the frame.

The lower and upper elongated plates 1 and 2 present, on their corresponding flanks 14, 24, means 6, 7 for fastening to a road lighting post or the like 8 shown in FIGS. 2 to 4. The fastening means 6, 7 are substantially identical and therefore only the upper ones, indicated with 7, shall be described hereafter. They are constituted by a bracket 70 for fastening to the post, by a bracket 71 for fastening to the elongated plate 2 of the frame and by a telescoping arm 72. The bracket 70 for anchoring to the post by means of screws is appropriately curved and integral to a first segment of the telescoping arm 72, whereas the bracket 71 for fastening to the frame by means of screws is integral with a second segment of the same arm. The two segments of the telescoping arm 72 are able mutually to slide and be locked together in a conventional manner once the desired distance of the frame from the post has been determined. The fastening means 6, 7 have been shown as individual and centrally positioned. Naturally, they can be double, as an alternative, with a different disposition on the lower and upper elongated plates.

According to this first embodiment, wherein the panel 5 is constituted by a sheet of clear material bearing images and/or captions to be lighted, the uprights 3, 4 are made of opaque material. Inside them at least two fluorescent lamps, generically indicated with the number 9, are housed on related end lamp holders (generically indicated with the number 90). The lamps 9 are destined to emit light only through the longitudinal openings 30, 40 of the uprights 3, 4 within the edges 51, 52 of the panel 5 in the form of a plate.

Conventionally, the lamps 9, through the respective lamp holders 90, are connected with a power supply circuit having, for instance, an electronic starter 91, situated on the upper elongated plate 2 and housed in a hermetic protective box 92. Advantageously, this power supply circuit is connected to a road lighting line, the same that powers the lamp or lamps borne by the post and which is slaved to a start control regulated by a ambient light sensor (not shown in the drawings).

Conveniently, although not shown in the drawings, the plate that constitutes the panel 5 is machined to present a surface with micro-prisms for the diffusion of the light emitted therein by the fluorescent lamps.

In Figures from 2 to 4 the lighted panel device according to the invention is shown in a configuration with three boards individually united, by means of the means for fastening to the post 8.

As shown in FIG. 2, the images and/or captions to be lighted are realised on a film, indicated as 53, able to be applied adhesively and removably onto the surface oriented towards the exterior of the plate. Alternatively, the plate of the panel 5 is treated with serigraphy or otherwise printed.

In a second embodiment of the invention, instead of being constituted by a plate, the panel 5 can be constituted by a lighted display of variable images and/or captions, indicated as 54 in FIG. 2. This display can be constituted by a LED or plasma panel or by a panel of a different kind. Naturally, if the panel 5 is a lighted display of these types, the uprights do not serve the purpose of containing the fluorescent lamps, but only that of supporting the panel. The display control means, not further described, are comprised in the related system for communicating with a remote station (not shown in the drawings) and are able to receive communication or notification messages to be displayed on the panel. Similarly, the panel in the form of a plate, and means for controlling, powering, and lighting the lighted display, destined to be situated in proximity thereto, are positioned on an upper elongated plate 2 and housed in a protective hermetically sealed box 92.

The display is connected to an electrical power supply line independent from the road lighting line slaved to ambient light sensors. Alternatively, the display can be connected to the same road lighting network; in this case the control, power supply, and lighting means include a buffer battery (not shown herein).

As shown in FIG. 3, the lighted panel device according to the invention, in one of its variations, comprises sensors, indicated generically with the number 93, for the detection of polluting substances contained in the atmosphere. The sensors, through dedicated lines or radio transmission, send atmospheric pollution data to a remote unit which in turn could send warning messages to be displayed on a panel of the lighted panel device of the invention.

As an alternative to the configurations shown, though not one expressly shown herein, the device according to the invention can be realised with only two panels individually applied to a lighting post or the like in opposite positions. The configuration with the panels fastened in consecutive positions, the uprights being adjacent, is advantageous because it allows to view the same images from multiple directions.

The device with three lighted panels shown in FIGS. 2 through 4 presents a covering element 26, shaped according to a configuration with a substantially triangular plan form and provided with a central hole 27. The covering element 26 can therefore comprise three integral moulded elements, generically indicated with the number 28, approached to the road lighting post or the like. The covering element 26 is destined to be set down and removably fastened jointly onto the respective upper elongated plates of the three boards.

It may be advantageous for at least a panel of the three boards to be constituted by a lighted display of variable images and/or captions, whilst the other two can be constituted by a panel in the form of lighted plate.

Naturally, the invention thus conceived can be subject to numerous modifications and variations, without thereby departing from the scope of the inventive concept.

What is claimed is:

1. Lighted panel device able to be applied onto posts, in particular road lighting posts, for the display of advertisements and notices, characterized in that it comprises at least a board including:
    a frame having horizontal sides in a form of lower and upper elongated plates (12), both provided, on opposite faces, with housing seats (11) for a panel and, on corresponding flanks (14, 24), with means (6, 7) for fastening to a road lighting post (8) and, as vertical sides, two hollow section uprights (3, 4) each having a longitudinal opening (30, 40) for housing a panel;
    a panel (5) for the lighted display of images and captions, having lower and upper edges (50) received in said respective housing seats (11) obtained on said lower and upper elongated plates (1, 2) and side edges (51, 52) each inserted and held by said uprights in said longitudinal housing opening (30, 40);
    means for controlling, powering and illuminating the panel (5);
    a covering and finishing element removably fastened into said upper elongated plate (25; 26);
    said lower elongated plate (1) being provided, in correspondence with the respective extremities of said panel housing seat (11), with a pair of equal receiving cavities (15, 16), of conforming section, of the lower extremities (31, 41) of said uprights (3.4); said upper elongated plate (2) being provided, in correspondence with the respective extremities of said panel housing seat, with a pair of through holes (20, 22), of conforming section, for the upper extremities (32, 42) of said uprights (3, 4) respective closure stoppers (22, 23) being provided for said through holes (20, 21).

2. Lighted panel device according to claim 1, characterised in that said hollow profile of the uprights (3, 4) has open circular section.

3. Lighted panel device according to claim 1, characterised in that said hollow profile of the uprights (3, 4) has open polygonal section.

4. Lighted panel device according to claim 1, characterised in that said elongated seats (11) and panel housing openings (30, 40) are provided with sealing gaskets.

5. Lighted panel device according to claim 1, characterised in that each of said fastening means (6, 7) of each lower and upper elongated plate (1, 2) is constituted by a bracket (70) for securing to the lighting post (8), by a central bracket (71) for securing to the elongated plate (1, 2) of the frame and by a telescoping arm (72) having at least a first segment integral to said bracket (70) for securing to the post and at least a second segment integral to the bracket (71) for securing to the elongated plate; organs for the adjustment and locking of said segment of the telescoping arm (72) being provided.

6. Lighted panel device according to claim 1, characterised in that:
    said panel (5) is constituted by a sheet of clear material bearing images and captions to be lighted and in that said uprights (3, 4) are made of opaque material; and in that said means for controlling, supplying power, and lighting the panel comprise:
        at least two fluorescent lamps (9) housed on related extremity lamp holders (90) inside each uprights (3, 4) and destined to emit light only through said longitudinal openings (30, 49) of the uprights (3, 4) within the edges (51, 52), held thereby, of said sheet;
        a power supply circuit with electronic starter (91) for said at least two fluorescent lamps (9), situated on the upper elongated plate (2) and housed in a hermetically sealed protective box (92).

7. Lighted panel device according to claim 6, characterised in that said power supply circuit is connected to a road lighting grid slaved to a starting control regulated by a ambient light sensor.

8. Lighted panel device according to claim 6, characterised in that said sheet is made of suitable synthetic material and machined to present a surface with micro-prisms for the diffusion of the lighted emitted in said sheet by said fluorescent lamps (9).

9. Lighted panel device according to claim 6, characterised in that said images and captions to be lighted are realized on a film (53) which can be applied adhesively and removably onto outwardly oriented surface of said sheet.

10. Lighted panel device according to claim 6, characterised in that said sheet is treated with serigraphy to show images and captions.

11. Lighted panel device according to claim 1, characterised in that said panel (5) is constituted by a luminous display (54) of variable images and captions whose control means are comprised in a related communication system with a remote station and are able to receive communication or notification messages to be displayed on the panel and in that said control, power supply and illumination means are situated on an upper elongated plate (2) and housed in a hermetically sealed protective box (92).

12. Lighted panel device according to claim 11, characterised in that said display (54) is a LED panel.

13. Lighted panel device according to claim 11, characterised in that said display (54) is a plasma panel.

14. Lighted panel device according to claim 11, characterised in that said display (54) is connected to an electrical power supply line independent from the road lighting grid slaved to ambient light sensors.

15. Lighted panel device according to claim 11, characterised in that said control, power supply and illumination means comprise a buffer battery.

16. Lighted panel device according to claim 1, characterised in that it comprises sensors (93) for detecting polluting substances contained in the atmosphere transmitting related data to a remote unit which monitors pollution.

17. Lighted panel device according to claim 1, characterised in that it comprises at least two of said boards applied individually to a road lighting post (8) in opposite positions.

18. Lighted panel device according to claim 1, characterised in that it comprises at least two of said boards applied individually to a road lighting post (8) in consecutive positions.

19. Lighted panel device according to claim 1, characterised in that it comprises three boards applied individually to a road lighting post (8) in consecutive positions with respective said uprights (3, 4) adjacent and wherein said covering element (26) shaped according to a configuration with substantially triangular plan form and provided with a central hole (27), comprises three integral moulded elements (28), approached to the road lighting post (8) and destined to be set down and removably fastened jointly onto the respective upper elongated plates (2).

20. Lighted panel device according to claim 19, characterised in that at least one panel (5) of said three boards is constituted by a luminous display (54) of variable images and captions whose control means are comprised in a related communication system with a remote station and are able to receive communication or notification messages to be displayed on the panel and in that said control, power supply and illumination means are situated on an upper elongated plate (2) and housed in a hermetically sealed protective box (92).

* * * * *